United States Patent [19]

Cenker et al.

[11] 3,891,579

[45] June 24, 1975

[54] PROCESS FOR THE PREPARATION OF ISOCYANURATE FOAMS EMPLOYING HALOGENATED ALIPHATIC ALKANOL ACCELERATORS

[75] Inventors: Moses Cenker, Trenton; Thirumurti L. Narayan, Riverview, both of Mich.

[73] Assignee: BASF Wyandotte Corporation, Wyandotte, Mich.

[22] Filed: Feb. 25, 1974

[21] Appl. No.: 445,110

[52] U.S. Cl. ............ 260/2.5 AW; 260/2.5 AC; 260/2.5 AM; 260/2.5 AJ; 260/77.5 AC; 260/77.5 MA; 260/77.5 NC
[51] Int. Cl. ...................... C08g 22/44; C08g 33/02
[58] Field of Search... 260/2.5 AW, 2.5 BF, 2.5 AC, 260/77.5 AC, 77.5 NC, 77.5 MA, 2.5 AM, 2.5 AJ

[56] References Cited
UNITED STATES PATENTS

| | | | |
|---|---|---|---|
| 3,294,753 | 12/1966 | Beitchman | 260/2.5 AW |
| 3,516,950 | 6/1970 | Haggis | 260/2.5 AW |
| 3,644,232 | 2/1972 | Bernard | 260/2.5 AW |
| 3,779,956 | 12/1973 | Morehouse | 260/2.5 AJ |

FOREIGN PATENTS OR APPLICATIONS

| | | | |
|---|---|---|---|
| 994,411 | 6/1965 | United Kingdom | 260/2.5 AM |

*Primary Examiner*—Melvyn I. Marquis
*Assistant Examiner*—C. Warren Ivy
*Attorney, Agent, or Firm*—Joseph D. Michaels; Bernhard R. Swick; Robert E. Dunn

[57] ABSTRACT

Polyisocyanurate foams are prepared by the polymerization of organic polyisocyanates in the presence of a tertiary amine trimerization catalyst and a halogenated aliphatic alcohol accelerator. The resulting foams have improved flame retardant and friability properties.

8 Claims, No Drawings

PROCESS FOR THE PREPARATION OF ISOCYANURATE FOAMS EMPLOYING HALOGENATED ALIPHATIC ALKANOL ACCELERATORS

BACKGROUND OF THE INVENTION

1. Field Of The Invention

The present invention relates to the preparation of cellular foams characterized by isocyanurate linkages. More particularly, the invention relates to the use of a halogenated alkanol to increase the rate of isocyanurate formation in the preparation of cellular foams by the polymerization of organic polyisocyanates in the presence of tertiary amine trimerization catalysts.

2. Prior Art

The preparation of foams containing isocyanurate linkages is well known in the art. Generally, the foams are prepared by condensing an organic polyisocyanate in the presence of a trimerization catalyst and a blowing agent. Representative of such teachings are the disclosures found in U.S. Pat. Nos. 2,993,870; 3,644,232 and 3,723,366. The prior art also teaches that foams containing isocyanurate linkages can be prepared by condensing an organic polyisocyanate with a trimerization catalyst in the presence of various accelerators. Representative of such teachings are the disclosures found in U.S. Pat. Nos. 3,516,950 and 3,609,149.

SUMMARY OF THE INVENTION

The present invention relates to an improved process for the preparation of isocyanurate foams employing a catalytically sufficient amount of a tertiary amine trimerization catalyst and as accelerator or promoter therefor a monofunctional halogenated alkanol. The use of a halogenated alkanol provides for foams characterized by improved flame retardant properties as well as reduced friability.

DESCRIPTION OF THE PREFERRED EMBODIMENTS

In accordance with the present invention, rigid cellular foams are prepared by the catalytic condensation of an organic polyisocyanate in the presence of a catalytically sufficient amount of a tertiary amine trimerization catalyst and a halogenated alkanol accelerator. The products which are produced in accordance herewith are rigid cellular foams containing isocyanurate linkages.

The halogenated alkanols employed in this invention are linear or branched monohydric halogenated alkanols containing from 1 to 6 carbon atoms. Thus, included within the scope of this invention are the primary, secondary or tertiary alkanols. Any of the halogens having atomic number of 35 or less is satisfactory and the alkanol can be partially or completely halogenated as well as halogenated with one or a mixture of halogens. Illustrative of the halogenated alkanols of this invention are 2-chloroethanol, 2,3-dibromopropanol, 1,1-dichloro-2-methyl-2-propanol, 1,1,1-trichloro-2-propanol, 2,2,2-trichloroethanol, 2,2,2-trifluoroethanol, 1,1,1,3,3,3-hexafluoro-2-propanol, perfluoro-t-butanol, and 1,1,1-trichloro-2-methyl-2-propanol. Generally from about 0.1 part to 10 parts of halogenated alkanol per 100 parts of organic polyisocyanate will be employed in the process of the present invention.

Tertiary amine trimerization catalysts which are employed in the present invention include 1,3,5-tris(N,N-dialkylaminoalkyl)-s-hexahydrotriazines; the alkylene oxide and water adducts of 1,3,5-tris(N,N-dialkylaminoalkyl)-s-hexahydrotriazines; 2,4,6-tris)-dimethylaminomethyl)phenol; o-, p- or a mixture of o- and p-dimethylaminomethylphenol and triethylene diamine or the alkylene oxide and water adducts thereof. These compounds are well known in the art, as is their use as catalysts which promote isocyanurate linkages.

1,3,5-Tris(N,N-dialkylaminoalkyl)-s-hexahydrotriazine compounds have heretofore been described as useful isocyanate trimerization catalysts. See U.S. Pat. No. 3,723,366, the disclosure of which is hereby incorporated by reference. Preferred within this group of hexahydrotriazine compounds is 1,3,5-tris(N,N-dimethylaminopropyl)-s-hexahydrotriazine.

The alkylene oxide and water adducts of a 1,3,5-tris(N,N-dialkylaminoalkyl)-s-hexahydrotriazine is presumably a quaternary ammonium hydroxide. These compounds are generally prepared by reacting equimolar amounts of the hexahydrotriazine, alkylene oxide and water at a temperature of from about 10°C. to 80°C. for a period of from about five minutes to two hours. Preferred within this group of compounds is the propylene oxide and water adduct of 1,3,5-tris(N,N-dimethylaminopropyl)-s-hexahydrotriazine. See U.S. Pats. Nos. 3,746,709 and 3,766,103, the disclosures of which are hereby incorporated by reference.

2,4,6-Tris(dimethylaminomethyl)phenol as well as o-, p- and a mixture of o- and p-(dimethylaminomethyl)phenol are known compounds which are commercially available products sold by Rohm & Haas under the trade names DMP-30 and DMP-10. Triethylenediamine and the alkylene oxide and water adducts thereof are also well known compounds.

The amount of trimerization catalyst which may be employed in the present invention is generally from 0.1 part to 20 parts of catalyst per 100 parts of organic polyisocyanate.

The organic polyisocyanate used in the preparation of the foams in accordance with the present invention corresponds to the formula:

$$R''(NCO)_z$$

wherein R'' is a polyvalent organic radical which is either aliphatic, aralkyl, alkaryl, aromatic or mixtures thereof, and z is an integer which corresponds to the valence of R'' and is at least two. Representative of the organic polyisocyanates contemplated herein includes, for example, the aromatic diisocyanates, such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like; the aromatic triisocyanates such as 4,4',4''-triphenylmethane triisocyanate, 2,4,6-toluene triisocyanates; the aromatic tetraisocyanates, such as 4,4'-dimethyldiphenylmethane-2,2'-5,5'-tetraisocyanate, and the like; arylalkyl polyisocyanates, such as xylylene diisocyanate; aliphatic polyisocyanates, such as hexamethylene-1,6-diisocyanate, lysine diisocyanate methyl ester and the like; and mixtures thereof. Other organic polyisocyanates include polymethylene polyphenylisocyanate, hydrogenated methylene diphenylisocyanate, m-phenylene diisocyanate, naphthylene-1,5- diisocyanate, 1-methoxyphenyl-2,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate.

These polyisocyanates are prepared by conventional methods known in the art such as the phosgenation of the corresponding organic amine.

Still another class of organic polyisocyanates contemplated for use herein are the so-called "quasi-prepolymers." These quasi-prepolymers are prepared by reacting an excess of organic polyisocyanate or mixtures thereof with a minor amount of an active hydrogen containing compound as determined by the well-known Zerewitinoff test, as described by Kohler in *Journal Of The American Chemical Society*, 49, 3181 (1927). These compounds and their methods of preparation are well known in the art. The use of any one specific active hydrogen compound is not critical hereto, rather any such compound can be employed herein.

Suitable active hydrogen-containing groups as determined by the Zerewitinoff method which are reactive with an isocyanate group include —OH, —NH—, —COOH, and —SH. Examples of suitable types of organic compounds containing at least two active hydrogen-containing groups which are reactive with an isocyanate group are hydroxyl terminated polyesters, polyalkylene ether polyols, hydroxylterminated polyurethane polymers, polyhydric polythioethers, alkylene oxide adducts of phosphorus-containing acids, polyacetals, aliphatic polyols, aliphatic thiols including alkane, alkene and alkyne thiols having two or more —SH groups; diamines including both aromatic, aliphatic and heterocyclic diamines, as well as mixtures thereof. Compounds which contain two or more different groups within the above-defined classes may also be used in accordance with the process of the present invention such as, for example, amino alcohols which contain an amino group and a hydroxyl group. Also, compounds may be used which contain one —SH group and one —OH group as well as those which contain an amino group and a —SH group.

Any suitable hydroxyl-terminated polyester may be used such as are obtained, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α, β-diethyl-succinic acid, isophthalic acid, terephthalic acid, hemimellitic acid, and 1,4-cyclohexane-dicarboxylic acid. Any suitable polyhydric alcohol, including both aliphatic and aromatic, may be used such as ethylene glycol, 1,3-propylene glycol, 1,2-propylene glycol, 1,4-butylene glycol, 1,3-butylene glycol, 1,2-butylene glycol, 1,5-pentanediol, 1,4-pentanediol, 1,3-pentanediol, 1,6-hexanediol, 1,7-heptanediol, glycerol, 1,1,1-trimethylolpropane, 1,1,1-trimethylolethane, hexane-1,2,6-triol, α-methyl glucoside, pentaerythritol, and sorbitol. Also included within the term "polyhydric alcohol" are compounds derived from phenol such as 2,-2-bis(4-hydroxyphenyl)propane, commonly known as Bisphenol A.

The hydroxyl-terminated polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above, or they may be made using the same components that make up the hydroxyl-terminated polyester with only a portion of the components being a diamine such as ethylenediamine.

Any suitable polyalkylene ether polyol may be used such as the polymerization product of an alkylene oxide or of an alkylene oxide with a polyhydric alcohol. Any suitable polyhydric alcohol may be used such as those disclosed above for use in the preparation of the hydroxylterminated polyesters. Any suitable alkylene oxide may be used such as ethylene oxide, propylene oxide, butylene oxide, amylene oxide, and heteric or block copolymers of these oxides. The polyalkylene polyether polyols may be prepared from other starting materials such as tetrahydrofuran and alkylene oxide-tetrahydrofuran copolymers; epihalohydrins such as epichlorohydrin; as well as aralkylene oxides such as styrene oxide. The polyalkylene polyether polyols may have either primary or secondary hydroxyl groups and, preferably, are polyethers prepared from alkylene oxides having from two to six carbon atoms such as polyethylene ether glycols, polypropylene ether glycols, and polybutylene ether glycols. The polyalkylene polyether polyols may be prepared by any known process such as, for example, the process disclosed by Wurtz in 1859 and *Encyclopedia Of Chemical Technology*, Vol. 7, pp. 257–262, published by Interscience Publishers, Inc. (1951) or in U.S. Pat. No. 1,922,459. Alkylene oxide adducts of Mannich condensation products are also useful in the invention.

Alkylene oxide adducts of acids of phosphorus which may be used include those neutral adducts prepared from the alkylene oxides disclosed above for use in the preparation of polyalkylene polyether polyols. Acids of phosphorus which may be used are acids having a $P_2O_5$ equivalency of from about 72% to about 95%. The phosphoric acids are preferred.

Any suitable hydroxyl-terminated polyacetal may be used such as, for example, the reaction product of formaldehyde or other suitable aldehyde with a dihydric alcohol or an alkylene oxide such as those disclosed above.

Any suitable aliphatic thiol including alkane thiols containing at least two —SH groups may be used such as 1,2-ethanedithiol, 1,2-propanedithiol, 1,3-propanedithiol, and 1,6-hexanedithiol; alkenethiols such as 2-butene-1,4-dithiol, and alkynethiols such as 3-hexyne-1,6-dithiol.

Any suitable polyamine may be used including aromatic polyamines such as methylene dianiline, polyarylpolyalkylene polyamine (crude methylene dianiline), p-aminoaniline, 1,5-diaminonaphthalene, and 2,4-diaminotoluene; aliphatic polyamines such as ethylenediamine, 1,3-propylenediamine; 1,4-butylenediamine, and 1,3-butylenediamine, as well as substituted secondary derivatives thereof.

In addition to the above hydroxyl-containing compounds, other compounds which may be employed include graft polyols. These polyols are prepared by the in situ polymerization product of a vinyl monomer in a reactive polyol medium and in the presence of a free radical initiator. The reaction is generally carried out at a temperature ranging from about 40°C. to 150°C.

The reactive polyol medium generally has a molecular weight of at least about 500 and a hydroxyl number ranging from about 30 to about 600. The graft polyol has a molecular weight of at least about 1500 and a viscosity of less than 40,000 cps. at 10% polymer concentration.

A more comprehensive discussion of the graft polyols and their method of preparation can be found in U.S. Pats. No. 3,383,351; 3,304,273; 3,652,639, and in U.S. patent application Ser. No. 311,809 filed Dec. 4, 1972, the disclosures of which are hereby incorporated by reference.

Also, polyols containing ester groups can be employed in the subject invention. These polyols are prepared by the reaction of an alkylene oxide with an organic dicarboxylic acid anhydride and a compound containing a reactive hydrogen atom. A more comprehensive discussion of these polyols and their method of preparation can be found in U.S. Pats. No. 3,585,185; 3,639,541 and 3,639,542. As is clear from the above, the particular polyol ingredient employed in the preparation of the quasiprepolymer is not a critical aspect of the present invention. Any compound containing at least two reactive hydrogen atoms may be so used.

In a preferred embodiment of the present invention, the condensation of the organic polyisocyanate is carried out in the presence of a polyol. Any of the polyols discussed above in connection with the preparation of the quasi-prepolymers may be employed in the process of the subject invention. Generally from 0.01 to 0.5 equivalent of a polyol (per equivalent of NCO) having an average functionality of 2 to 8 and an average hydroxyl equivalent of from about 100 to about 3000 will be employed in the process of the subject invention. The use of a polyol results in foams of reduced friability without any loss in flame retardancy. If a polyol is employed in the invention, a catalytic amount of a urethane-promoting catalyst may also be employed. These catalysts are well known in the art and include the metal or organometallic salts of carboxylic acid and tertiary amines. Representative of such compounds are: dibutyltin dilaurate, dibutyltin diacetate, stannous octoate, lead octoate, cobalt naphthenate, and other metal or organometallic salts of carboxylic acids in which the metal is bismuth, titanium, iron, antimony, uranium, cadmium, aluminum, mercury, zinc, or nickel as well as other organometallic compounds such as are disclosed in U.S. Pat. No. 2,846,408. Tertiary amines such as triethylenediamine, triethylamine, diethylcyclohexylamine, dimethylethanolamine, methylmorpholine, trimethylpiperazine, N-ethylmorpholine and diethylethanolamine may also be employed as well as mixtures of any of the above. Preferred urethane-promoting catalysts are the tin salts of carboxylic acids such as dibutyltin dilaurate and dibutyltin diacetate. Generally, the amount of the urethane-promoting catalyst employed will be from 0.01 part to 10 parts per 100 parts of organic polyisocyanate.

The foams may be prepared by adding the catalyst to the mixture of polyisocyanate and a blowing agent. Optionally, a polyol is blended with the catalyst and added to the mixture of polyisocyanate and the blowing agent.

The present invention also contemplates the incorporation of additional ingredients in the foam formulation to tailor the properties thereof. Thus, plasticizers, such as tris(2-chloroethyl) phosphate; surfactants, such as the silicone surfactants, e.g., alkylpolysiloxanes and polyalkyl siloxanes, may be employed in the invention.

In any event, the foams prepared in accordance herewith are rigid cellular products having a density of from about one pound to forty pounds per cubic foot which exhibit excellent flame properties, such as fire resistance, low smoke evolution and excellent weight retention.

Following are specific, non-limiting examples which are provided to illustrate the enumerated principles described herein. All parts are by weight unless otherwise indicated. In the examples, the compressive strength properties of the foams were determined in accordance with ASTM-1621, the flame retardant properties by ASTM D-3014 and the friability properties by ASTM C-421.

EXAMPLES 1-5

A series of foams was prepared by simultaneously adding a catalyst and a promoter to a reaction vessel equipped with a stirrer to which had been charged a polyisocyanate, a silicon surfactant and a blowing agent. An exotherm was generated and foam formation following soon after. Tables I and II, below, illustrate the details of the preparations as well as physical properties of some of the resulting foams. As the data in Tables I and II indicate, use of the halogenated alkanols in accordance with the process of the subject invention increased the rate of reaction and resulted in foams having improved compressive strength and friability without any loss in flame retardant properties. In Tables I and II the following abbreviations are employed:

TDI — a mixture of 80/20 by weight 2,4-, 2,6-tolylene diisocyanate

PAPI — polymethylene polyphenyl isocyanate

TDH — 1,3,5-tris(N,N-dimethylaminopropyl)-hexahydrotriazine

F-113 — 1,1,2-trifluoro-1,2,2-trichloroethane

DC-193 — polyalkylsiloxane-polyoxyalkylene copolymer, a foam stabilizer

Alcohol A — 2,2,2-trifluoroethanol

Alcohol B — 2,2,2-trichloroethanol

Alcohol C — 1,1,1,3,3,3-hexafluoro-2-propanol

Alcohol D — 2,3-dibromopropanol

TABLE I

| Example | Isocyanate pbw. PAPI | TDI | Catalyst Blend, pbw. Alcohol | TDH | DC-193 pbw. | F-113 pbw. | Cream Time, sec. | Rise Time, sec. | Tack Free, sec. | Density, pcf. |
|---|---|---|---|---|---|---|---|---|---|---|
| Control-1 | 100 | — | — | 6 | 1.0 | 10 | 210 | 260 | 260 | 4.4 |
| Control-2 | 50 | 50 | — | 8 | — | 15 | 60 | 85 | 75 | N.D. |
| 1 | 100 | — | 5A | 3 | 1.0 | 10 | 25 | 45 | 45 | 4.6 |
| 2 | 100 | — | 5B | 3 | 0.5 | 10 | 50 | 80 | 70 | 4.3 |
| 3 | 50 | 50 | 5B | 3 | 0.5 | 10 | 15 | 20 | 20 | 2.5 |
| 4 | 90 | 10 | 5C | 3 | 1.0 | 10 | 35 | 85 | 80 | 4.8 |
| 5 | 100 | — | 5D | 8 | 1.0 | 15 | 65 | 170 | 120 | N.D. |

N.D.=not determined

TABLE II

Physical Properties Of Foams

| Example | Density, pcf. | Comp. Str. 10% Def., psi. | Tumb. Friab. 10% Wt. Loss | Closed Cell Corr. % | Butler Chimney Test % Wt. Ret. | Flame Ht., in. | Time to SX, sec. |
|---|---|---|---|---|---|---|---|
| Control-1 | 4.4 | 12 | 98 | 82 | 96 | 4 | 10 |
| 1 | 4.6 | 109 | 18 | 94 | 96 | 3 | 10 |
| 2 | 4.3 | 31 | 71 | 89 | 97 | 4 | 10 |
| 4 | 4.8 | 60 | 18 | 93 | 98 | 4 | 10 |

EXAMPLES 6–28

A series of foams was prepared by simultaneously adding a co-catalyst system comprising 1,3,5-tris(N,N-dimethylaminopropyl)hexahydrotriazine (TDH) and 2,3-dibromopropanol (DBP) to a reaction vessel equipped with a high speed stirrer to which had been charged a polyisocyanate and various optional ingredients such as polyol, a urethane catalyst, a plasticizer, a surfactant and a blowing agent. An exotherm was generated and foam formation followed soon after. Tables III and IV, below, illustrate the details of the preparations as well as physical properties of some of the resulting foams. In all cases, infrared spectroscopic analyses indicate that the foams exhibit isocyanurate and urethane linkages. In addition to the abbreviations mentioned before, the following abbreviations are employed in the Tables:

DBTDL — dibutyltin dilaurate
F-11B — monofluorotrichloromethane
Polyol I — propylene oxide adduct of Mannich condensation product of one mole of phenol, diethanolamine and formaldehyde (hydroxyl number of 530)

TABLE III

| | Ingredients, Parts | | | | | | | |
|---|---|---|---|---|---|---|---|---|
| | Isocyanate | | | | | | | |
| Example | PAPI | TDI | DBP | TDH | DBTDL | DC-193 | Polyol I | F-11B |
| 6 | 300 | 0 | 10.5 | 3.5 | 3.5 | 3.5 | 60 | 55 |
| 7 | 300 | 0 | 16 | 8 | 0 | 4 | 60 | 60 |
| 8 | 300 | 0 | 10.5 | 3.5 | 3.5 | 3.5 | 68 | 50 |
| 9 | 300 | 0 | 16 | 8 | 0 | 4 | 68 | 55 |
| 10 | 300 | 0 | 10.5 | 3.5 | 3.5 | 3.5 | 72 | 50 |
| 11 | 300 | 0 | 16 | 8 | 0 | 4 | 72 | 55 |
| 12 | 300 | 0 | 10.5 | 3.5 | 3.5 | 3.5 | 78 | 50 |
| 13 | 300 | 0 | 16 | 8 | 0 | 4 | 78 | 55 |
| 14 | 300 | 0 | 10.5 | 3.5 | 3.5 | 3.5 | 84 | 50 |
| 15 | 300 | 0 | 16 | 8 | 0 | 4 | 84 | 55 |
| 16 | 300 | 0 | 9 | 6 | 3 | 3 | 60 | 55 |
| 17 | 300 | 0 | 9 | 6 | 3 | 3 | 60 | 58 |
| 18 | 300 | 0 | 9 | 6 | 3 | 3 | 66 | 58 |
| 19 | 300 | 0 | 9 | 6 | 3 | 3 | 72 | 55 |
| 20 | 270 | 30 | 9 | 6 | 3 | 3 | 60 | 50 |
| 21 | 270 | 30 | 9 | 6 | 3 | 3 | 66 | 50 |
| 22 | 270 | 30 | 9 | 6 | 3 | 3 | 72 | 50 |
| 23 | 270 | 30 | 10.5 | 3.5 | 3.5 | 3.5 | 60 | 55 |
| 24 | 270 | 30 | 16 | 8 | 0 | 4 | 60 | 63 |
| 25 | 270 | 30 | 10.5 | 3.5 | 3.5 | 3.5 | 66 | 55 |
| 26 | 270 | 30 | 16 | 8 | 0 | 4 | 66 | 60 |
| 27 | 270 | 30 | 10.5 | 3.5 | 3.5 | 3.5 | 72 | 55 |
| 28 | 270 | 30 | 16 | 8 | 0 | 4 | 72 | 60 |

TABLE IV

Physical Properties of Foams

| Example | Density, pcf. | Comp. Str. 10% Def., psi. | Tumb. Friab. % Wt. Loss | Closed Cell Corr. % | Butler Chimney Test % Wt. Ret. | Flame Ht., in. | Time to SX sec. |
|---|---|---|---|---|---|---|---|
| 6 | 2.0 | 13 | 1 | 98 | 83 | 9 | 10 |
| 7 | 1.9 | 12 | 11 | 97 | 81 | 7 | 12 |
| 8 | 1.9 | 17 | 3 | 97 | 83 | 8 | 10 |
| 9 | 2.0 | 24 | 16 | 98 | 83 | 8 | 10 |
| 10 | 1.9 | 21 | 3 | 99 | 81 | 9 | 10 |
| 11 | 2.1 | 19 | 13 | 97 | 83 | 8 | 10 |
| 12 | 2.1 | 26 | 5 | 98 | 72 | 10 | 13 |
| 13 | 1.9 | 20 | 11 | 99 | 77 | 9 | 11 |
| 14 | 1.9 | 23 | 6 | 99 | 68 | 10 | 19 |
| 15 | 2.0 | 25 | 9 | 97 | 67 | 10 | 16 |
| 16 | 2.2 | 14 | 5 | 96 | 87 | 8 | 10 |
| 17 | 2.0 | 14 | 8 | 96 | 79 | 8 | 13 |
| 18 | 1.9 | 17 | 4 | 98 | 77 | 9 | 11 |
| 19 | 1.9 | 18 | 8 | 99 | 74 | 9 | 15 |
| 20 | 1.7 | 16 | 19 | 101 | 82 | 9 | 10 |
| 21 | 1.6 | 15 | 21 | 100 | 75 | 9 | 12 |
| 22 | 1.7 | 17 | 19 | 100 | 74 | 10 | 12 |
| 23 | 1.8 | 13 | 17 | 95 | 72 | 8 | 18 |
| 24 | 1.9 | 20 | 21 | 97 | 76 | 10 | 12 |
| 25 | 1.7 | 14 | 21 | 97 | 73 | 8 | 15 |
| 26 | 1.7 | 10 | 28 | 96 | 71 | 10 | 13 |
| 27 | 2.3 | 25 | 40 | 98 | 94 | 5 | 10 |
| 28 | 1.7 | 13 | 24 | 97 | 71 | 10 | 14 |

EXAMPLES 29–32

A series of foams was prepared by simultaneously adding a co-catalyst system comprising TDH and 2,2,2-trifluoroethanol (TFE) to a reaction vessel equipped with a high speed stirrer to which had been charged a polyisocyanate and various optional ingredients such as a polyol, a urethane catalyst, a plasticizer, a surfactant and a blowing agent. An exotherm was generated and foam formation followed soon after. Table V, below, illustrates the details of the preparations as well as physical properties of some of the resulting foams. In all cases, infrared spectroscopic analyses indicate that the foams exhibit isocyanurate and urethane linkages.

with a high speed stirrer to which had been charged a polyisocyanate and various optional ingredients such as a polyol, a urethane catalyst, a plasticizer, a surfactant and a blowing agent. An exotherm was generated and foam formation followed soon after. Table VI, below, illustrates the details of the preparations as well as physical properties of some of the resulting foams. In all cases, infrared spectroscopic analyses indicate that the foams exhibit isocyanurate and urethane linkages. In addition to the abbreviations mentioned before, the following abbreviations are employed in Table VI:

DBTDA — dibutyltin diacetate

Polyol II — a 425 molecular weight propylene oxide adduct of trimethylolpropane

TABLE VI

| | Ingredients, Parts | | | | | | | | | |
|---|---|---|---|---|---|---|---|---|---|---|
| Example | Isocyanate PAPI | TDI | TCE | TDH | DBTDL | DBTDA | DC-193 | Polyol I | Polyol II | F-11B |
| 33 | 300 | 0 | 9 | 6 | 3 | 0 | 3 | 60 | 0 | 55 |
| 34 | 300 | 0 | 9 | 6 | 3 | 0 | 3 | 66 | 0 | 55 |
| 35 | 300 | 0 | 9 | 6 | 3 | 0 | 3 | 72 | 0 | 55 |
| 36 | 270 | 30 | 9 | 6 | 3 | 0 | 3 | 60 | 0 | 50 |
| 37 | 270 | 30 | 9 | 6 | 3 | 0 | 3 | 66 | 0 | 50 |
| 38 | 270 | 30 | 9 | 6 | 3 | 0 | 3 | 72 | 0 | 50 |
| 39 | 300 | 0 | 15 | 6 | 0 | 3 | 3 | 0 | 30 | 55 |
| 40 | 300 | 0 | 15 | 6 | 0 | 3 | 3 | 0 | 30 | 55 |
| 41 | 300 | 0 | 15 | 6 | 0 | 3 | 3 | 60 | 0 | 60 |
| 42 | 300 | 0 | 15 | 6 | 0 | 3 | 3 | 75 | 0 | 60 |

| | Physical Properties of Foams | | | | Butler Chimney Test | | |
|---|---|---|---|---|---|---|---|
| Example | Density, pcf. | Comp. Str. 10% Def., psi. | Tumb. Friab. % Wt. Loss | Closed Cell Corr. % | % Wt. Ret. | Flame Ht., in. | Time to SX sec. |
| 33 | 2.0 | 27 | N.D. | 98 | 86 | 8 | 10 |
| 34 | 1.9 | 26 | 8 | 99 | 84 | 7 | 12 |
| 35 | 2.0 | 28 | N.D. | 99 | 85 | 8 | 10 |
| 36 | 1.8 | 24 | 18 | 99 | 84 | 8 | 10 |
| 37 | 1.9 | 26 | 13 | 100 | 93 | 9 | 12 |
| 38 | 1.9 | 25 | 12 | 99 | 84 | 9 | 10 |
| 39 | 2.2 | 38 | 10 | N.D. | 96 | 5 | 10 |
| 40 | 1.9 | 29 | 19 | N.D. | 93 | 5 | 10 |
| 41 | 1.9 | 27 | 9 | N.D. | 84 | 8 | 10 |
| 42 | 1.9 | 29 | 15 | N.D. | 82 | 9 | 10 |

N.D. = not determined

TABLE V

| | Examples | | | |
|---|---|---|---|---|
| | 29 | 30 | 31 | 32 |
| Ingredients, pbw.: | | | | |
| PAPI | 300 | 300 | 270 | 270 |
| TDI | 0 | 0 | 30 | 30 |
| TFE | 9 | 9 | 9 | 9 |
| DBTDL | 3 | 3 | 3 | 3 |
| TDH | 3 | 3 | 3 | 3 |
| DC-193 | 3 | 3 | 3 | 3 |
| F-11B | 60 | 60 | 50 | 50 |
| Polyol I | 60 | 66 | 60 | 66 |
| Physical Properties: | | | | |
| Density, pcf. | 1.7 | 1.8 | 1.8 | 1.8 |
| Compressive Strength 10% Def., psi. | 20 | 21 | 21 | 21 |
| Tumb. Friab. % Wt. Loss | 20.4 | 26.6 | 34.1 | 29.2 |
| Closed Cell Corr. % | 99 | 101 | 100 | 101 |
| Butler Chimney Test. | | | | |
| % Wt. Ret. | 83 | 75 | 80 | 75 |
| Flame Ht., in. | 8 | 10 | 10 | 10 |
| Time to SX, sec. | 10 | 11 | 10 | 10 |

EXAMPLES 33–42

A series of foams was prepared by simultaneously adding a co-catalyst system comprising TDH and 2,2,2-trichloroethanol (TCE) to a reaction vessel equipped

EXAMPLE 43

Following the procedure described in Example 1, a foam was prepared by charging 160 parts of polymethylene polyphenyl isocyanate, 40 parts of a mixture of 80/20 by weight 2,4-, 2,6-tolylene diisocyanate, 20 parts of 1,1,2-trifluoro-1,1,2-trichloroethane and 2 parts of DC-193 to a reaction vessel. To the charge was added a mixture of 6 parts of 1,1,1,3,3,3-hexafluoro-2-propanol and 16 parts of 2,4,6-tri(dimethylaminoethyl)phenol. An exotherm was generated and foam formation followed. Infrared spectroscopic analysis indicates that the foam exhibits isocyanurate linkages.

The embodiments of the invention in which an exclusive property or privilege is claimed are defined as follows:

1. A process for the preparation of a cellular foam characterized by isocyanurate linkages which comprises condensing an organic polyisocyanate in the presence of:

a. a blowing agent, b. a catalytically sufficient amount of a tertiary amine trimerization catalyst, and c. from 0.1 part to 10 parts by weight based on the weight of the organic polyisocyanate of a monohydric halogenated alkanol having from 1 to 6 carbon atoms.

2. The process of claim 1 wherein the organic polyisocyanate is selected from the group consisting of toluene diisocyanate, methylene diphenyl diisocyanate, polyphenyl polymethylene polyisocyanate and mixtures thereof.

3. The process of claim 1 wherein the tertiary amine is 1,3,5-tris(N,N-dimethylaminopropyl)-s-hexahydrotriazine.

4. The process of claim 1 carried out in the presence of from 0.01 to 0.5 equivalent of a polyol per equivalent of organic isocyanate, said polyol having an average functionality of 2 to 8 and an average hydroxyl equivalent of from about 100 to 3000.

5. The process of claim 4 carried out in the presence of a catalyst which promotes urethane linkages.

6. The process of claim 5 wherein the catalyst which promotes urethane linkages is dibutyltin diacetate or dibutyltin dilaurate.

7. The process of claim 1 wherein the alkanol is 2,3-dibromopropanol.

8. The process of claim 1 wherein the alkanol is 2,2,2-trichloroethanol or 2,2,2-trifluoroethanol.

* * * * *